(12) United States Patent
Hammonds

(10) Patent No.: US 7,040,425 B2
(45) Date of Patent: May 9, 2006

(54) TRAILER MULE VEHICLE FOR MOVING SEMI-TRAILERS

(76) Inventor: Carl L. Hammonds, 7358 Pine Hollow Dr., Humble, TX (US) 77395

( * ) Notice: Subject to any disclaimer, the term of this patent is extended or adjusted under 35 U.S.C. 154(b) by 0 days.

(21) Appl. No.: 10/711,755

(22) Filed: Oct. 1, 2004

(65) Prior Publication Data
US 2006/0070774 A1   Apr. 6, 2006

(51) Int. Cl.
B62D 11/04  (2006.01)
B60D 1/44   (2006.01)

(52) U.S. Cl. .................................................. 180/6.48
(58) Field of Classification Search ................ 180/6.2, 180/6.44, 6.48, 6.5
See application file for complete search history.

(56) References Cited

U.S. PATENT DOCUMENTS

| | | | |
|---|---|---|---|
| 75,274 A | 3/1868 | Hurd | |
| 1,467,456 A | 9/1923 | Silvius | |
| 2,869,686 A | 1/1959 | Glanz | |
| 3,763,945 A | 10/1973 | Danielson | |
| 3,820,790 A | 6/1974 | Peterson | |
| 3,938,608 A | 2/1976 | Folco-Zambelli | |
| 4,077,647 A | 3/1978 | Nagayama | |
| 4,111,273 A | 9/1978 | Blackburn et al. | |
| 4,142,599 A | 3/1979 | Schmitt | |
| 4,301,881 A | 11/1981 | Griffin | |
| 4,306,329 A | 12/1981 | Yokoi | |
| 4,324,301 A | 4/1982 | Everly | |
| 4,638,445 A | 1/1987 | Mattaboni | |
| 4,655,470 A | 4/1987 | Lin | |
| 4,973,206 A | 11/1990 | Engle | |
| 5,090,185 A | 2/1992 | Meeks | |
| 5,139,102 A | 8/1992 | Pocapalis | |
| 5,246,081 A | 9/1993 | Engle | |
| 5,330,222 A | 7/1994 | Halverson et al. | |
| 5,381,987 A | 1/1995 | Carns | |
| 5,484,030 A | 1/1996 | Glenn | |
| 5,516,169 A | 5/1996 | Falk et al. | |
| 5,623,818 A | 4/1997 | Ledbetter | |
| 5,704,201 A | 1/1998 | Van Vleet | |
| 6,095,268 A | 8/2000 | Jones, Jr. | |
| 6,112,838 A | 9/2000 | Klein et al. | |
| 6,250,663 B1 | 6/2001 | Maloy | |
| 6,408,970 B1 | 6/2002 | Eng | |
| 6,581,703 B1* | 6/2003 | Hammonds | 180/6.2 |
| 6,668,471 B1* | 12/2003 | Cook et al. | 37/410 |
| 6,830,114 B1* | 12/2004 | Hammonds | 180/6.2 |
| 2003/0213626 A1* | 11/2003 | Hafendorfer | 180/6.48 |
| 2003/0222447 A1* | 12/2003 | Powell | 280/759 |
| 2004/0079560 A1* | 4/2004 | Hammonds | 180/6.48 |

* cited by examiner

Primary Examiner—Kevin Hurley
(74) Attorney, Agent, or Firm—Gary L. Bush, Esq.; Andrew Kurth LLP

(57) ABSTRACT

A trailer mule vehicle with a frame, two independent drive wheels located at the rear of the frame on a common axis, two caster support wheels located at the front of the frame, and a fifth wheel plate generally centered between and positioned above the rear drive wheels. Each drive wheel is powered independently of the other and can rotate at variable speeds in either direction. The vehicle is capable of rotation about the center of the fifth wheel plate. The fifth wheel plate is mounted on an articulated arm which raises and lowers the fifth wheel plate for rapid coupling to and transportation of a semi-trailer without the need for retracting the semi-trailer's landing gear.

11 Claims, 3 Drawing Sheets

TRAILER MULE VEHICLE FOR MOVING SEMI-TRAILERS

(1) FIELD OF THE INVENTION

This invention relates generally to a wheeled vehicle designed to turn about a central vertical axis. In particular, the invention relates to powered utility riding vehicles of the type useful for moving trailers about a trailer terminal, truck yard, or warehouse where rotation-in-place steering is advantageous.

(2) DESCRIPTION OF PRIOR ART

Within the transportation industry, semi-trailers are often routed through trailer distribution terminals or trailer yards. Space is normally at a premium resulting in limited maneuvering space within the yards. The trailers must often be shuttled about the yards and are typically moved using terminal tractors. Conventional terminal tractors, also known as trailer jockies or yard mules, typically resemble shortened road tractors. They are configured with two axles, one in front, the other in the rear. The rear axle is fixed to the frame of the vehicle and provides motive force via a pair of dual wheels. The front axle provides for vehicle steering via two steerable wheels which simultaneously pivot with a limited angular range.

A semi-trailer is pivotably coupled by a standard fifth wheel plate hitch located above the rear axle. Since there is a fixed distance between the fixed rear drive axle and the front steerable axle, a turning radius is required that far exceeds the space actually occupied by the vehicle itself. The longer the distance between front and rear axles, the larger the turning radius that is required to change directions of the vehicle. A large turning radius makes maneuvering around tight areas difficult and often dangerous. In a terminal where semi-trailers are frequently moved and space is constrained, a tractor with a small turn radius is advantageous. Because of their smaller lengths and turn radii, specialized terminal tractors are generally preferable to retired road tractors for use within terminals.

In a truck yard, an operator must often move in reverse to maneuver in tight spaces. Operators are required to look over their shoulders in order to back up. In a congested location, hazards from reversing are increased. Even with shortened terminal tractors, it is often difficult, even for a skilled operator, to park a semi-trailer against a wall in a slot or stall between two other trailers. In some instances, a backing maneuver cannot be accomplished without uncoupling the trailer, moving the tractor to a more favorable angle, and re-coupling the trailer to complete the move. In other instances, it may be necessary to jockey the trailer back and forth many times in order to back the trailer into a given stall.

It is also time consuming to back a conventional terminal tractor fifth wheel plate into engagement with the king pin of the trailer even with the V-shaped slot and the double-oscillation mount common with fifth wheel plates. Precision maneuvering is required while the driver must look backward resulting in operator fatigue and inefficiency. The driver must also exit the tractor cab in order to connect the air hoses and electrical cable to the trailer. The hitching operation is further complicated in the instances where a pintle hook/gudgeon hitch is used in place of the fifth wheel plate/king pin hitch.

In a truck yard where trailers are routinely coupled, moved, and then uncoupled, any increase in coupling efficiency, maneuvering efficiency, and safety amount to a significant cost savings. It is desirable, therefore, to have a vehicle with greater maneuverability and the ability to simplify the hitching process to enhance the safety of the operator and of the surroundings.

Prior art vehicles are known for turning with a zero turning radius, or so called "turning on the spot." U.S. Pat. No. 3,938,608 describes a vehicle with a single center-mounted pivoting drive motor that is rotated about a vertical axis in order to change directions of the vehicle. The '608 vehicle is supported with three or more swivel wheels located at equal radial distances from the center wheel. The '608 vehicle lacks tractive force because of the single drive wheel. A single drive wheel must be rotated in order to change the vehicle direction, and although the single drive wheel can be turned to direct the vehicle in any direction, it does not provide directional stability for the case where a force is exerted on the vehicle from an angle to the line of intended travel. For example, a force against the '608 vehicle at a 20 degree angle to the right or left of the line of travel would force the single '608 wheel to skid, causing loss of directional control.

(3) IDENTIFICATION OF OBJECTS OF THE INVENTION

A primary object of this invention is to provide a service vehicle which is designed and arranged for moving semi-trailers with enhanced maneuverability.

Another object of the invention is to provide a service vehicle that can turn on the spot and be of the smallest physical size relative to the space it occupies.

Another object of the invention is to provide a service vehicle which reduces the risk of accidents which may result in damage or injury to equipment or operating personnel.

Another object of the invention is to provide a vehicle which expedites the process of hitching a trailer by allowing the driver to face the hitch assembly and trailer while positioning the vehicle to the trailer for coupling.

Another object of the invention is to provide a vehicle for moving semi-trailers from one location to another location which obviates the need for the operator to drive in a reverse direction while seated in a forward-facing direction.

Another object of the invention is to provide a vehicle that can push a trailer while providing an unobstructed view under the trailer for the driver to promote safe and efficient docking of the trailer.

Another object of the invention is to increase the operating efficiency of a semi-trailer terminal or truck yard by allowing a driver to connect and disconnect the primary and brake air hoses and electrical cable (pigtail) without having to dismount the tractor.

SUMMARY OF THE INVENTION

The objects identified above along with other features and advantages of the invention are incorporated in a vehicle which provides unique maneuverability and efficiency due to a combination of its characteristics including the configuration of its rear drive wheels and front support wheels. The trailer mule vehicle provides for handling semi-trailers with minimal space required for maneuverability and safety of operation.

The vehicle has two independent drive wheels located at the rear of the vehicle on a common horizontal axis which intersects a vertical axis generally passing through a fifth wheel plate hitch assembly. Each drive wheel is spaced longitudinally at the same distance from the vertical axis, with each wheel having the capability to move independently and at infinitely variable speeds in forward and reverse directions. Two support wheels are located at the front of the vehicle and are arranged as swivel casters. Steering is accomplished by changing the speed or direction of rotation of one of the two drive wheels in relation to the other. The caster wheels mounted to an outrigger assembly provide stability for the vehicle. The vehicle can rotate about the vertical axis to any radial heading. Accordingly, the vehicle requires a true zero turning or maneuvering radius about the fifth wheel plate hitch. The size of the vehicle according to the invention is generally smaller than that of a conventional vehicle with a drive axle and a steering axle.

A fifth wheel plate is included for coupling to a semi-trailer having a king pin. Alternatively or additionally, the trailer mule hitch assembly may have a pintle hook assembly for coupling to a trailer having a drawbar and gudgeon. The drive wheels are preferably mounted directly to the vehicle frame and support the tongue weight of an attached semi-trailer. A driver's seat is provided which can be selectively rotated to face either the front or the rear of the vehicle. Control levers are provided to the operator seated in the driver's seat for the forward and reverse facing directions.

When an attached semi-trailer needs to be backed into a stall, the operator, seated in the reverse-direction, drives the vehicle while pushing the trailer to a desired position. The motion is similar to backing up a conventional vehicle with a towed trailer except that with the trailer mule vehicle of the invention, the operator faces in the direction of motion. When a trailer needs to be towed, the driver's seat is rotated to face forward, and the trailer is pulled in a conventional fashion.

The vehicle can move about the fifth wheel plate, change directions in a turning circle with a radius smaller than the length of the vehicle, and push or tow trailers with precise control. Such capabilities reduce the operating space on the ground required to move or handle a trailer being manipulated, thus increasing operating efficiency. Safety is increased, because the operator of the trailer mule vehicle can always be facing the direction that the vehicle is moving, never having to back up and look backward.

BRIEF DESCRIPTION OF THE DRAWINGS

The invention is described below with reference to preferred embodiment which is illustrated by the attached drawings, of which.

DESCRIPTION OF THE PREFERRED EMBODIMENTS OF THE INVENTION

Figure 1:
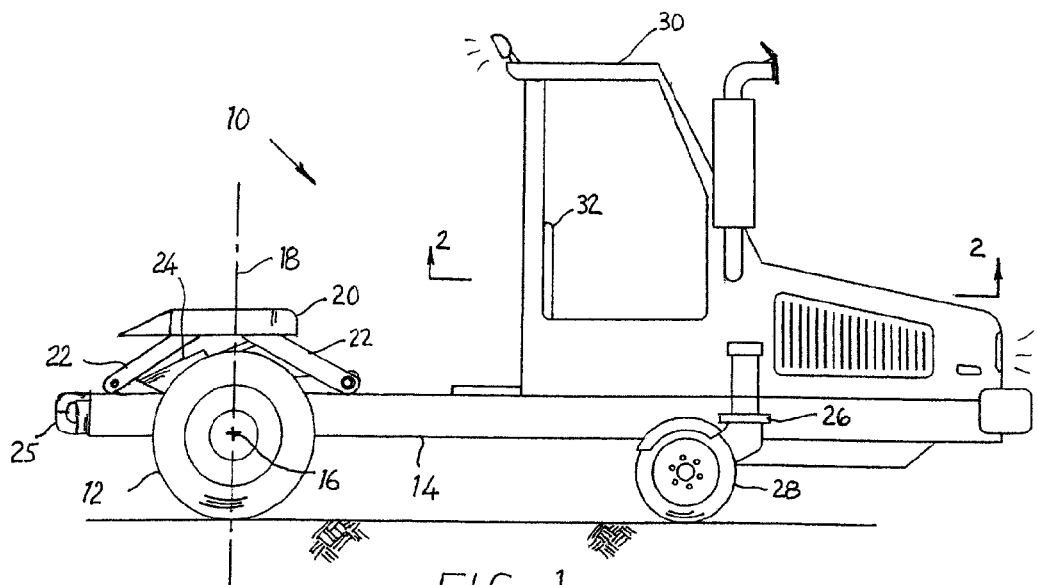
FIG. 1 is a side view of the trailer mule vehicle according to the invention showing an articulated elevating fifth wheel plate hitch assembly located directly above the drive wheels and a cab located above caster-mounted wheels.
Figure 2:
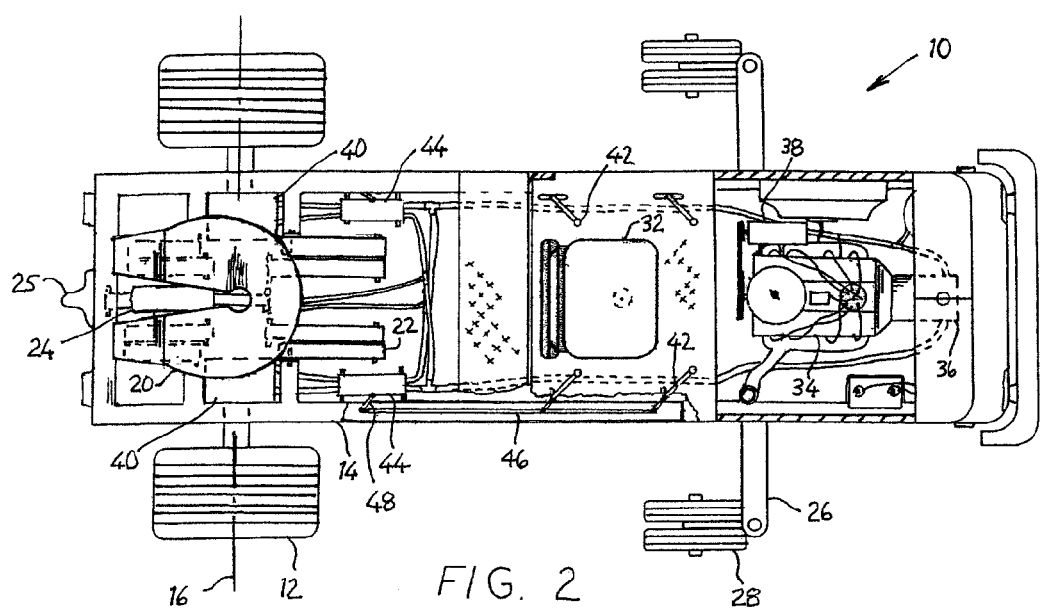
FIG. 2 is a plan view of the trailer mule vehicle of FIG. 1 with a partial cross-section through the cab to show the major drive components.

As shown in FIGS. 1 and 2, the trailer mule vehicle 10 includes primary drive wheels 12 mounted on a frame 14. The drive wheels 12 may have single or dual tire configuration. The wheels 12 are mounted along a common horizontal axis 16. A vertical axis 18 is centered between the drive wheels 12 and intersects the horizontal axis 16. Attached to frame 14 forward of drive wheels 12 are two outriggers 26 with distal ends supported by small wheels arranged as swivel casters 28. The caster wheels 28 freewheel and swivel in response to vehicle movement caused by drive wheels 12. The outriggers 26 and swivel caster wheels 28 support the vehicle 10 while allowing it to maneuver in tight spaces. A cab 30 with a driver's seat 32 provides a suitable operating environment for vehicle 10.

A fifth wheel plate hitch 20 is coupled to frame 14 generally at vertical axis 18 by articulated arms 22. The arms 22 are pivotably connected to the frame 14 and are cross-braced for unitary movement. The fifth wheel plate 20 can be raised and lowered by one or more actuators 24 pivotably connected between the vehicle frame 14 and the arms 22 of the fifth wheel plate 20. Although other arrangements may be used, the arms 22 are preferably designed and arranged so that the center of the fifth wheel plate 20 generally coincides with the vertical axis 18 regardless of elevation in order to keep the tongue load of an attached semi-trailer centered over drive wheels 12. The fifth wheel plate actuator 24 is preferably hydraulically, pneumatically, or electrically powered. Variable height fifth wheel plates are well known in the art, as exemplified in U.S. Pat. No. 4,111,273 issued to Blackburn et al. (Sep. 5, 1978) and U.S. Pat. No. 5,330,222 issued to Halverson et al. (Jul. 19, 1994), both incorporated herein by reference. Because the fifth wheel plate 20 must rise to carry the tongue load of a semi-trailer, a conventional cushioned suspension is not desirable; a cushioned suspension increases the distance the fifth wheel plate must travel in order to raise the trailer. Thus, drive wheels 12 preferably employ a solid mount directly to the frame 14. The vehicle 10 may have a pintle hook assembly 25 attached to the back end of the frame 14 for coupling to a trailer having a drawbar and gudgeon. The pintle hook assembly 25 may be either in addition to or in place of the fifth wheel plate 20.

Referring to FIG. 2, a power source 34 mounted to frame 14 is provided for driving a hydraulic pump 36 and air compressor 38. The power source 34 may be a diesel or gasoline engine or an electric motor/battery assembly. The hydraulic pump 36 provides balanced pressurized hydraulic fluid to separate hydraulic motor 40 gearbox assemblies, one for each drive wheel 12. The air compressor 38 provides pneumatic brake air for semi-trailer use. A driver's seat 32 for the operator is mounted on frame 14 using a lazy-susan bearing which allows the seat to rotate 360 degrees. Detents lock the seat 32 in both the forward and reverse facing directions. The preferred embodiment of the invention employs four control levers 42—two for control of the right wheel 12 and two for control of the left wheel 12. When the driver's seat is facing forwards as shown in FIG. 2, then the forward pair of left and right control levers 42 is preferably used to control the vehicle. When the driver's seat is facing backwards, for backing an attached semi-trailer for example, the rear pair of left and right control levers 42 is preferably used. Alternatively, a single pair of preferably adjustable control levers may be used in place of forward and rear pairs. FIG. 2 shows the right set of forward and rear control levers 42 connected by a common linkage 46 and bell crank 48 to control valve 44. The left side is similarly arranged. Alternative arrangements, including independent control valves 44 for each control lever 42, may also be used.

The speed and direction of rotation of motors 40 and drive wheels 12 is controlled by the left and right control levers 42 which operate hydraulic control valves 44, respectively. The left and right control valves 44 are in turn fluidly coupled to and control the speed and direction of the left and right drive wheel hydraulic motors 40, respectively. The control levers 42 and control valves 44 operate exactly the same for the left and right drive wheels 12. Each control lever 42 and control valve 44 has a center neutral position, such that when a lever is at such neutral position, the wheel associated with that lever is hydraulically braked. If a lever 42 is moved forward, the corresponding control valve 44 ports hydraulic fluid to the corresponding wheel motor 40 for turning the respective wheel 12 in the forward direction. Likewise, if a lever 42 is moved backward, the hydraulic fluid flow is reversed at the output of the corresponding control valve 44 for turning the respective hydraulic motor 40 and attached drive wheel 12 in the backward direction. The greater the distance that a lever 42 is pushed or pulled from its neutral position, the greater the opening of corresponding control valve 44 becomes resulting in a greater mass flow rate of hydraulic fluid at the corresponding wheel motor 40 and a greater speed of corresponding drive wheel 12.

For example, if both a right and a left control lever 42 are moved in the same direction and amount at the same time, both drive wheels 12 move at the same speed, thereby causing straight movement of the vehicle over the ground, perpendicular to the horizontal axis 16. However, if the right and left control levers 42 are pushed forward or backward at an unequal distance from each other, the lever moved the greater distance will produce a greater speed of rotation at its corresponding wheel 12 causing the vehicle 10 to turn toward the drive wheel 12 that is turning slower. For instance, if a right control lever 42 is pushed farther forward than the left lever 42, the vehicle 10 turns to the left, and vice versa.

This drive wheel arrangement results in the trailer mule vehicle 10 having a zero minimum turn radius about the center of the fifth wheel plate (and the king pin of a coupled trailer). If a right control lever 42 is moved forward and a left control lever 42 is moved backward and both lever positions are the same in amount and opposite in direction, the left drive wheel 12 turns backward and the right drive wheel 12 turns forward, both at the same rate of rotation. In this instance, the vehicle 10 rotates about the vertical axis 18, which generally coincides with the center of the fifth wheel plate. Caster wheels 28 freely rotate to accommodate the vehicle rotation. Likewise, the counter-clockwise rotation described above becomes a clockwise rotation when the right wheel 12 rotates backward at the same rate as the forward rotation of the left wheel 12. In other words, when it is necessary to maneuver an attached trailer into a tight space, the trailer mule vehicle 10 can be made to pivot about the trailer axis 18 without actually moving the trailer. Once the vehicle 10 has been repositioned to arrive at an optimal angle, the parking maneuver may be completed. Thus, unlike the terminal tractors of prior art, it should never be necessary to uncouple and re-couple the trailer to maneuver it into a tight space.

Figure 3:
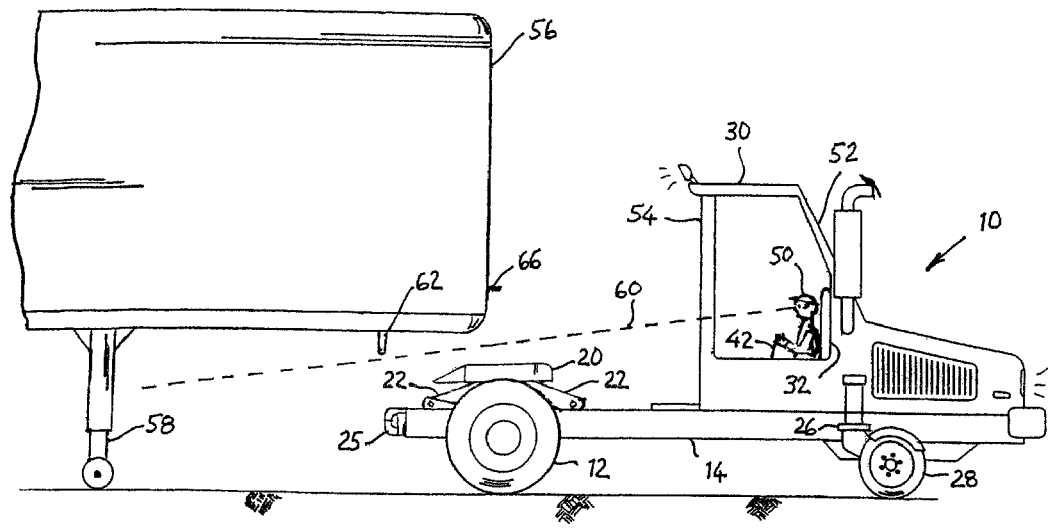
FIG. 3 is side view of the trailer mule vehicle according to the invention with the driver's seat oriented so that the driver faces the hitch assembly for coupling the fifth wheel plate to a trailer king pin.

FIG. 3 is a side view of the trailer mule vehicle 10 according to the invention. The cab front 52 is designed and arranged to allow the operator 50 clear view. The cab rear 54 serves as the point of entry and exit for the vehicle 10. In its lowest position, the fifth wheel plate 20 is sufficiently disposed below the standard 48 inch coupling height to mount a semi-trailer 56 with a landing gear 58 which is not fully extended or which has partially sunk into the ground.

Figure 4:
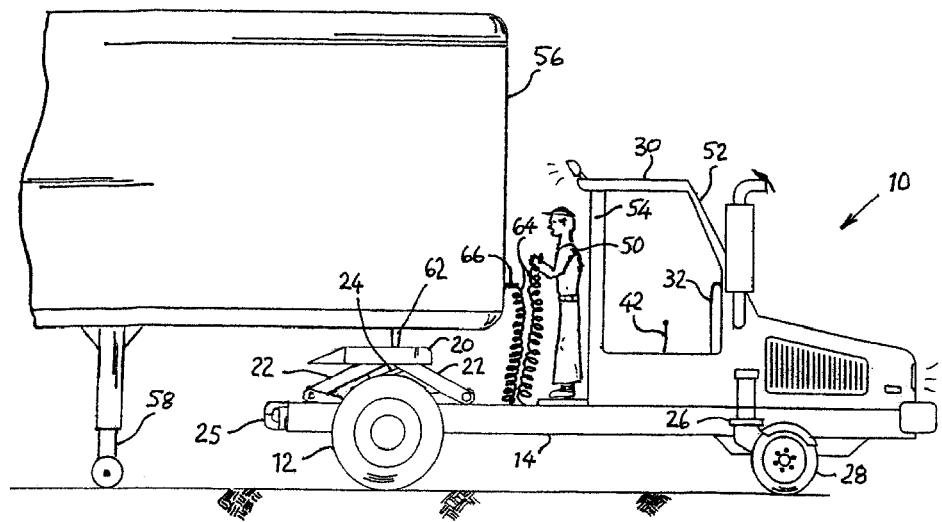
FIG. 4 is a side view of the trailer mule vehicle according to the invention illustrating how an operator can connect air hoses and electrical cables to a semi-trailer without being required to dismount from the vehicle.
Figure 5:
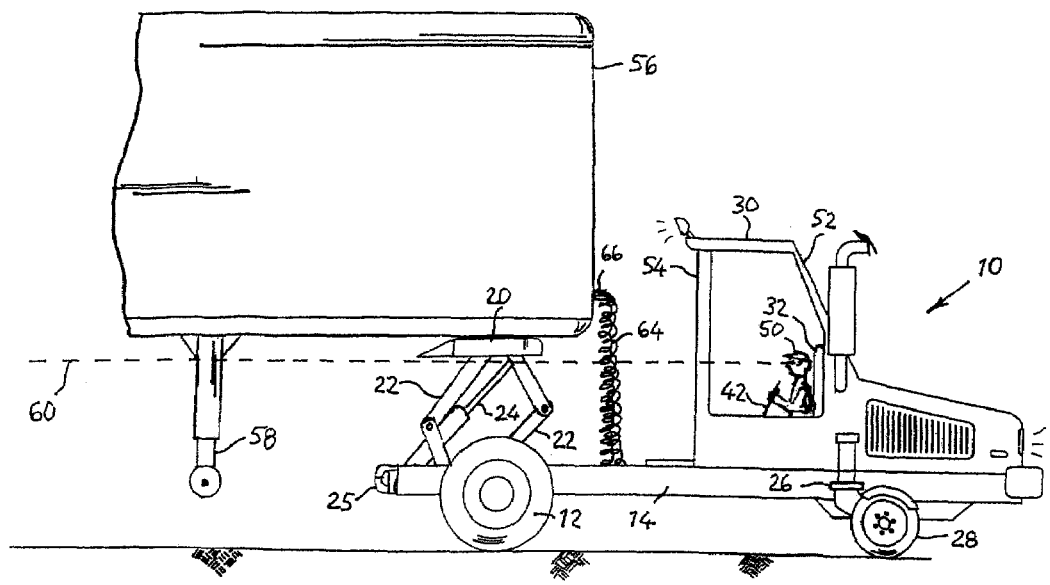
FIG. 5 is a side view of the trailer mule vehicle according to the invention with the driver's seat oriented so that the driver faces the attached trailer for backing the trailer and the driver has a clear line of sight in direction of travel underneath the trailer.
Figure 6:
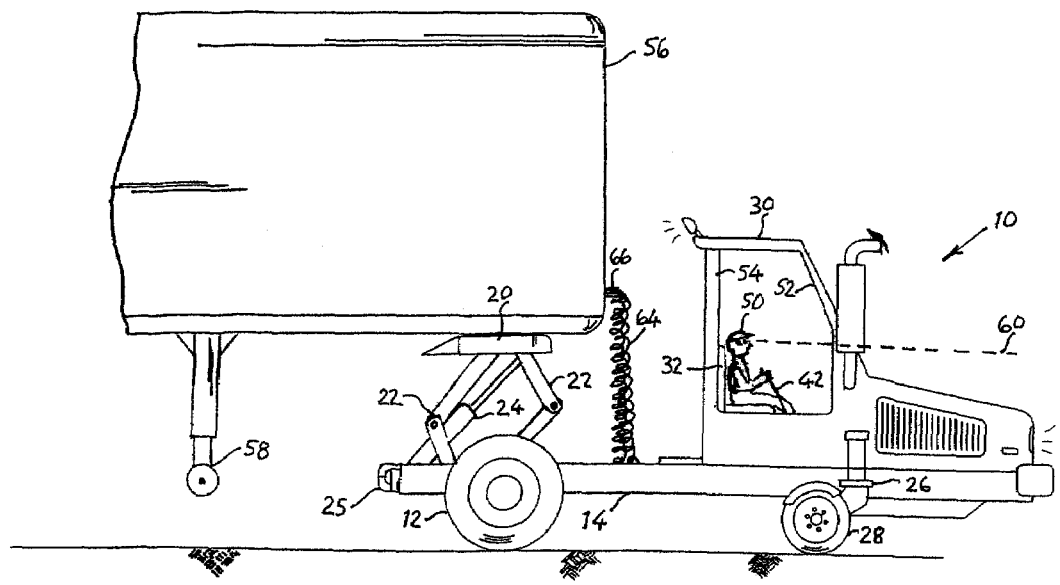
FIG. 6 is a side view of the trailer mule vehicle according to the invention with the driver's seat oriented so that the driver faces forward for ordinary towing of the trailer.

A typical sequence of moving a landed semi-trailer in a truck yard is shown in FIGS. 3–6. First, as shown in FIG. 3, the trailer mule vehicle 10 is in the process of hitching to a trailer 56. Because the driver's seat 32 faces the rear, the driver 50 has a clear line of sight 60 to the fifth wheel plate 20 without having to look over his shoulder as required in conventional terminal tractors. The fifth wheel plate 20 is lowered sufficiently below the king pin 62 of trailer 56 to facilitate the coupling process. Once the king pin 62 is properly aligned with the fifth wheel plate 20, the actuating arms 22 may be raised to complete the hitching process as shown in FIG. 4. Also illustrated in FIG. 4, the driver 50 connects the air hoses and electrical pigtail cable 64 to the trailer 56 without dismounting the trailer mule vehicle 10. The rear 54 of the vehicle cab 30 is preferably open or has a windscreen or other arrangement which allows the driver 50 to easily take a step or two to be within reach of the quick connect couplers 66 on trailer 56 to quickly couple air and electricity. Referring now to FIG. 5, the driver 50 raises the hitched semi-trailer 56 off of its extended landing gear 58 using actuator 24 which raises articulated arms 22 and fifth wheel plate 20. The driver 50 does not need to dismount the trailer mule vehicle 10 in order to manually raise the landing gear 58, thus speeding the trailer-moving process. The fifth wheel plate 20 is preferably elevated to a sufficient height to allow movement of a trailer 56 with sufficient clearance between the ground and fully-extended landing gear 58 and to allow the trailer mule driver 50 an unobstructed view underneath the trailer 56. Using the rear control levers 42, the driver 50 may back the trailer 56 while facing the trailer, and because the driver sits low in the vehicle 10, the driver 50 has a clear line of sight 60 under the trailer 56 in the direction of travel. This feature allows the driver 50 to see a dock or obstruction at the rear of trailer 56 thereby enhancing safety and docking speed. Referring to FIG. 6, once the driver 50 desires to tow the trailer 56, the driver's chair 32 is simply rotated in place to face away from the trailer 56. Using the forward control levers 42, conventional towing is now possible.

While the preferred embodiment of the invention has been illustrated in detail, it is apparent that modifications and adaptations of the preferred embodiment will occur to those skilled in the art. Such modifications and adaptations are in the spirit and scope of the invention as set forth herein.

What is claimed is:

1. A powered vehicle (10) comprising, a frame (14), first and second drive wheels (12) coupled to said frame along a horizontal axis (16), each of said drive wheels designed and arranged to be capable of powered clockwise and counter-clockwise rotation independent of the other, first and second support wheels (28) mounted to said frame, each of said support wheels designed and arranged to be capable of freewheel rotation about an independent horizontal axis and freewheel swiveling about an independent vertical axis, at least one control mechanism (42, 44, 46, 48) arranged and designed to control the direction of rotation and the speed of said first and second drive wheels, and a hitch assembly coupled to said frame, disposed generally centered between said first and second drive wheels above said horizontal axis, and designed and arranged to mate with a semi-trailer (56), said hitch assembly comprising, a fifth wheel plate (20), an articulating arm (22) coupled between said fifth wheel plate (20) and said frame (14), said arm (22) designed and arranged to allow said fifth wheel plate to be raised and lowered, and an actuator (24) coupled between said fifth wheel plate (20) and said frame (14) and designed and arranged to raise and lower said fifth wheel plate (20).

2. The vehicle of claim 1 wherein said hitch assembly further comprises, a pintle hitch (25).

3. A powered vehicle (10) comprising, a frame (14), first and second drive wheels (12) coupled to said frame alone a horizontal axis (16), each of said drive wheels designed and arranged to be capable of powered clockwise and counter-clockwise rotation independent of the other, first and second support wheels (28) mounted to said frame, each of said support wheels designed and arranged to be capable of freewheel rotation about an independent horizontal axis and freewheel swiveling about an independent vertical axis, at least one control mechanism (42, 44, 46, 48) arranged and designed to control the direction of rotation and the speed of said first and second drive wheels, a hitch assembly coupled to said frame, disposed generally centered between said first and second drive wheels above said horizontal axis, and designed and arranged to mate with a semi-trailer (56), and an operator seat (32) rotatably mounted on said frame (14).

4. The vehicle of claim 3 further comprising a first control lever (42) positioned on a first side of said operator seat (32), said first control lever operatively coupled to a first motor (40) for controlling the speed and direction of rotation of said first drive wheel (12), and a second control lever (42) positioned on a second side of said operator seat (32), said second control lever operatively coupled to a second motor (40) for controlling the speed and direction of rotation of said second drive wheel (12).

5. The vehicle of claim 4 further comprising, a third control lever (42) positioned on said first side of said operator seat (32), said third control lever operatively coupled to said first motor (40) for controlling the speed and direction of rotation of said first drive wheel (12), and a fourth control lever (42) positioned on said second side of said operator seat (32), said fourth control lever operatively coupled to said second motor (40) for controlling the speed and direction of rotation of said second drive wheel (12).

6. A powered vehicle (10) comprising, a frame (14), first and second drive wheels (12) coupled to said frame along a horizontal axis (16), each of said drive wheels designed and arranged to be capable of powered clockwise and counter-clockwise rotation independent of the other, first and second support wheels (28) mounted to said frame, each of said support wheels designed and arranged to be capable of freewheel rotation about an independent horizontal axis and freewheel swiveling about an independent vertical axis, at least one control mechanism (42, 44, 46, 48) arranged and designed to control the direction of rotation and the speed of said first and second drive wheels, a hitch assembly coupled to said frame, disposed generally centered between said first and second drive wheels above said horizontal axis, and designed and arranged to mate with a semi-trailer (56), a first outrigger (26) having near and distal ends, said near end of said first outrigger coupled to said frame (14) and said distal end of said first outrigger rotatably coupled to said first support wheel (28), and a second outrigger (26) having near and distal ends, said near end of said second outrigger coupled to said frame (14) and said distal end of said second outrigger rotatably coupled to said second support wheel (28).

7. The vehicle of claim 3 further comprising, a cab (30) coupled to said frame (14) and enclosing said seat (32).

8. The vehicle of claim 7 wherein, a rear portion (54) of said cab (30) has an opening sized to allow an operator to pass through.

9. A powered vehicle (10) comprising, a frame (14), first and second drive wheels (12) coupled to said frame along a horizontal axis (16), each of said drive wheels designed and arranged to be capable of powered clockwise and counter-clockwise rotation independent of the other, first and second support wheels (28) mounted to said frame, each of said support wheels designed and arranged to be capable of freewheel rotation about an independent horizontal axis and freewheel swiveling about an independent vertical axis, at least one control mechanism (42, 44, 46, 48) arranged and designed to control the direction of rotation and the speed of said first and second drive wheels, a hitch assembly coupled to said frame, disposed generally centered between said first and second drive wheels above said horizontal axis, and designed and arranged to mate with a semi-trailer (56), and a supply of air (38) fluidly coupled to an air hose (64) for coupling to said semi-trailer.

10. The vehicle of claim 1 further comprising, a pintle hitch (25).

11. The vehicle of claim 1 further comprising, an operator seat (32) rotatably mounted on said frame (14), wherein said fifth wheel plate (20) is designed and arranged to be raised to a height and said operator seat (32) is disposed at an elevation sufficient for an operator (50) seated in said operator seat and facing said raised fifth wheel plate has a generally horizontal line of sight (60) which passes underneath said semi-trailer (56) which is hitched to said fifth wheel plate, said line of sight extending to the distal end of said trailer.

* * * * *